July 22, 1930. C. A. BROOKS ET AL 1,770,897
RAILWAY TRAIN INDICATING APPARATUS
Filed Oct. 9, 1929
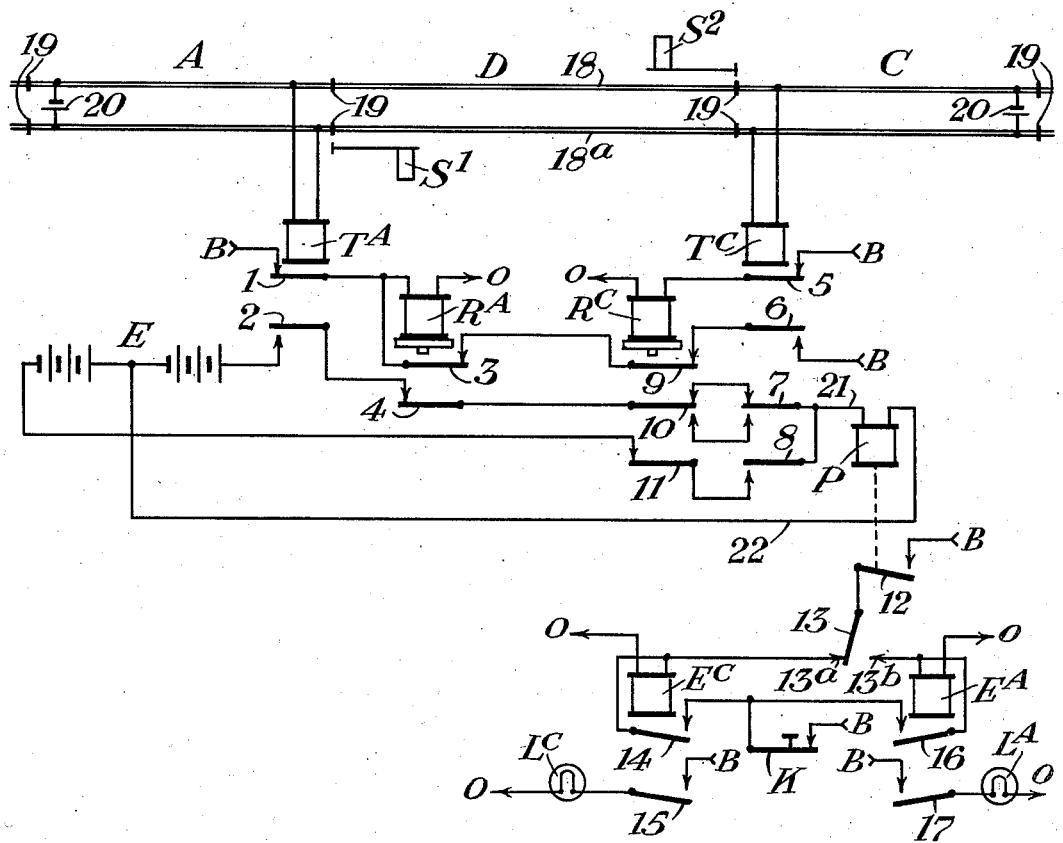
INVENTORS:
C. A. Brooks, and
L. C. Ritterbush,
by A. R. Vernill
Their attorney Patented July 22, 1930

1,770,897

UNITED STATES PATENT OFFICE

CHARLES A. BROOKS, OF SWISSVALE, AND LEONARD C. RITTERBUSH, OF PITTSBURGH, PENNSYLVANIA, ASSIGNORS TO THE UNION SWITCH & SIGNAL COMPANY, OF SWISSVALE, PENNSYLVANIA, A CORPORATION OF PENNSYLVANIA

RAILWAY TRAIN-INDICATING APPARATUS

Application filed October 9, 1929. Serial No. 398,300.

Our invention relates to apparatus for indicating the movements of railway trains, and has for an object the provision of means for indicating the conditions of two or more track sections at a distant point, such as a despatcher's office, with a minimum number of line wires.

We will describe one form of apparatus embodying our invention, and will then point out the novel features thereof in claims.

The accompanying drawing is a diagrammatic view showing one form of apparatus embodying our invention.

Referring to the drawing, the reference characters 18 and $18^a$ designate the track rails of a stretch of railway track, which stretch is divided into sections A, D and C, by means of insulated joints 19. Traffic through the middle section D is governed by two signals $S^1$ and $S^2$, which are controlled from a distant point, such as a despatcher's office, through means forming no part of our present invention and not illustrated in the present disclosure. In connection with systems of this character it becomes important for the despatcher to know when a train moving toward the right enters section A, and when a train moving toward the left enters section C, and the purpose of our invention is the provision of means for indicating at the despatcher's office the entrance of trains into these sections.

Section A is provided with a track circuit comprising a battery 20 and a track relay $T^A$; and section C is provided with a similar track circuit comprising a battery 20 and a track relay $T^C$. Associated with the track relay $T^A$ is a slow releasing relay $R^A$, and associated with the track relay $T^C$ is a slow releasing relay $R^C$. Relay $R^A$ is provided with a pick-up circuit which passes from terminal B of a suitable source of current, through front contact 1 of track relay $T^A$, and the winding of relay $R^A$ to terminal O of the same source of current. Relay $R^A$ is provided with a stick circuit which passes from terminal B, through back contact 6 of track relay $T^C$, front contact 9 of relay $R^C$, front contact 3 of relay $R^A$, and the winding of relay $R^A$ to terminal O. Relay $R^C$ is provided with a circuit which passes from terminal B, through front contact 5 of track relay $T^C$, and the winding of relay $R^C$ to terminal O. This relay is not provided with a stick circuit.

Located in the despatcher's office is a polarized relay P, which relay is controlled by the track relays T and the slow releasing relays R in the following manner.

When the sections A and C are both unoccupied, relay P is de-energized. Assuming that a train enters section A, track relay $T^A$ will become de-energized, thereby opening the pick-up circuit for relay $R^A$, and since the stick circuit for this relay is open at contact 6 of track relay $T^C$, relay R will likewise become de-energized and after a given interval of time its front contacts will open. During the interval between the opening of relay $T^A$ and the opening of relay $R^A$, relay P will be supplied with current of normal polarity by virtue of a circuit which passes from the right-hand terminal of a battery E, through back contact 2 of relay $T^A$, front contact 4 of relay $R^A$, front contact 10 of relay $R^C$, front contact 7 of relay $T^C$, line wire 21, winding of relay P, and line wire 22 to the middle point of battery E. This will cause relay P to be energized in such direction that its polar contact $13-13^b$ will be closed. As soon as relay $R^A$ releases, this circuit will be opened at the front contact 4 of that relay, so that relay P will become de-energized. While relay P is energized, a pick-up circuit will be closed for an indication relay $E^A$, which circuit passes from terminal B, through neutral contact 12 of relay P, polar contact $13-13^b$ of relay P, and the winding of relay $E^A$ to terminal O. When relay $E^A$ closes, it will close a stick circuit for itself, which circuit passes from terminal B, through a normally closed push button contact K, front contact 16 of relay $E^A$, and the winding of relay $E^A$ to terminal O. It follows that relay $E^A$ will remain energized until push button K is operated to open the stick circuit. While relay $E^A$ is energized, an indication lamp $L^A$ will be lighted by virtue of a circuit which includes front contact 17 of relay $E^A$.

We will now assume that a train enters section D—C. This will cause track relay $T^c$ to become de-energized, thereby opening the circuit for relay $R^c$, so that the latter relay will also become de-energized, whereupon its front contacts will open after a given interval of time. During the interval between the opening of relay $T^c$ and the opening of relay $R^c$, current of reverse polarity will be supplied to relay P by virtue of a circuit which passes from the left-hand terminal of battery E, through front contact 11 of relay $R^c$, back contact 8 of track relay $T^c$, line wire 21, winding of relay P, and line wire 22 to the middle point of battery E. This circuit will be opened at contact 11 as soon as relay $R^c$ releases. While the circuit is closed, relay P will be energized in such direction that its polar contact 13—$13^a$ is closed, thereby closing the pick-up circuit for a relay $E^c$, and this in turn will close a stick circuit for the same relay through the push button contact K. While relay $E^c$ is energized, an indication lamp $L^c$ will be lighted by virtue of a circuit which includes front contact 15 of relay $E^c$.

We will now assume that two trains enter section A—C simultaneously. Track relays $T^A$ and $T^c$ will open simultaneously, and the opening of relay $T^c$ will close the stick circuit for relay $R^A$ at back contact 6, so that relay $R^A$ will remain energized until after relay $R^c$ releases. During the interval between the opening of track relay $T^c$ and the opening of relay $R^c$, current of reverse polarity will be supplied to the winding of relay P through front contact 11 and back contact 8, so that relay $E^c$ will become energized and will in turn energize the lamp $L^c$ to indicate that the track section C is occupied. When relay $R^c$ releases, it will open at contact 9 the stick circuit for relay $R^A$, and during the interval between the release of relay $R^c$ and the release of relay $R^A$, current of normal polarity will be supplied to the winding of relay P, the circuit being from the right-hand terminal of battery E, through back contact 2 of relay $T^A$, front contact 4 of relay $R^A$, back contact 10 of relay $R^c$, back contact 7 of relay $T^c$, line wire 21, winding of relay P and line wire 22 to the middle point of battery E. This will cause relay P to be energized in such direction as to close its polar contact 13—$13^b$, thereby energizing indication relay $E^A$, which in turn will cause lamp $L^A$ to be lighted to indicate that section A is occupied by a train. Of course, each lamp $L^c$ and $L^A$ may subsequently be extinguished by opening the push button contact K.

It will be seen from the foregoing, that we have provided means for indicating the conditions of track sections A and C in the despatcher's office by means of only two line wires 21 and 22.

Although we have herein shown and described only one form of apparatus embodying our invention, it is understood that various changes and modifications may be made therein within the scope of the appended claims without departing from the spirit and scope of our invention.

Having thus described our invention, what we claim is:

1. In combination, two sections of railway track A and C, track circuits including track relays $T^A$ and $T^c$ for said two sections respectively, slow releasing relays $R^A$ and $R^c$ for said two track sections respectively, a circuit for relay $R^c$ controlled by a front contact of track relay $T^c$, a pick-up circuit for relay $R^A$ controlled by a front contact of track relay $T^A$, a stick circuit for relay $R^A$ controlled by a back contact of track relay $T^c$ and a front contact of relay $R^c$, a polarized relay, a circuit for the winding of said polarized relay including a source of current of one polarity and a back contact of track relay $T^A$ as well as a front contact of relay $R^A$ and front contacts of relays $R^c$ and $T^c$ all in series, a branch for said circuit around the front contacts of relays $R^c$ and $T^c$ and including back contacts of the same relays connected in series, a second circuit for the winding of said polarized relay including a source of current of the other polarity as well as a front contact of relay $R^c$ and a back contact of relay $T^c$ connected in series, and indication means controlled by said polarized relay.

2. In combination, two sections of railway track A and C, track circuits including track relays $T^A$ and $T^c$ for said two sections respectively, slow releasing relays $R^A$ and $R^c$ for said two track sections respectively, a circuit for relay $R^c$ controlled by a front contact of track relay $T^c$, a pick-up circuit for relay $R^A$ controlled by a front contact of track relay $T^A$, a stick circuit for relay $R^A$ controlled by a back contact of track relay $T^c$ and a front contact of relay $R^c$, a polarized relay, a circuit for the winding of said polarized relay including a source of current of one polarity and a back contact of track relay $T^A$ as well as a front contact of relay $R^A$ and front contacts of relays $R^c$ and $T^c$ all in series, a branch for said circuit around the front contacts of relays $R^c$ and $T^c$ and including back contacts of the same relays connected in series, a second circuit for the winding of said polarized relay including a source of current of the other polarity as well as a front contact of relay $R^c$ and a back contact of relay $T^c$ connected in series, two indication relays, a pick-up circuit for one indication relay including a neutral contact and one polar contact of said polarized relay, a pick-up circuit for the other indication relay including the neutral contact and the other polar contact of said polarized relay, a stick circuit for each indication relay including a normally closed push button contact, and two indicators controlled by said two indication relays respectively.

3. In combination, two sections of track A and C, track circuits including track relays $T^A$ and $T^C$ for said two sections respectively, a polarized relay, two circuits for said polarized relay including two sources of current of opposite polarities, means for closing the first circuit for said polarized relay for a short interval of time when track relay $T^C$ opens, means for closing the second circuit for said polarized relay for a short interval of time when track relay $T^A$ opens, means operating if both track relays open simultaneously to delay the closing of said second polarized relay circuit until the first circuit has been closed for the aforesaid short time interval, and indication means controlled by said polarized relay.

4. In combination, two sections of railway track A and C, track circuits including track relays $T^A$ and $T^C$ for said two sections respectively, slow releasing relays $R^A$ and $R^C$ for said two track sections respectively, a circuit for relay $R^C$ controlled by a front contact of track relay $T^C$, a pick-up circuit for relay $R^A$ controlled by a front contact of track relay $T^A$, a stick circuit for relay $R^A$ controlled by a back contact of track relay $T^C$ and a front contact of relay $R^C$, and indication means for said track sections controlled jointly by said track relays and slow releasing relays.

5. In combination, two sections of railway track A and C, track circuits including track relays $T^A$ and $T^C$ for said two sections respectively, slow releasing relays $R^A$ and $R^C$ for said two track sections respectively, a circuit for relay $R^C$ controlled by a front contact of track relay $T^C$, a pick-up circuit for relay $R^A$ controlled by a front contact of track relay $T^A$, a stick circuit for relay $R^A$ controlled by a back contact of track relay $T^C$ and a front contact of relay $R^C$, a polarized relay, means operating when a train enters section A to supply said polarized relay with current of one polarity during the interval between the opening of relay $T^A$ and the opening of relay $R^A$, means operating when a train enters section C to supply said polarized relay with current of the other polarity during the interval between the opening of relay $T^C$ and the opening of relay $R^C$, means operating when two trains enter said two sections simultaneously to supply said polarized relay with current of the second polarity during the interval between the opening of relay $T^C$ and the opening of relay $R^C$ and to subsequently supply the polarized relay with current of the first polarity during the interval between the opening of relay $R^C$ and the opening of relay $R^A$, and indication means for said sections controlled by said polarized relay.

6. In combination, two sections of railway track A and C, track circuits including track relays $T^A$ and $T^C$ for said two sections respectively, slow releasing relays $R^A$ and $R^C$ for said two track sections respectively, a circuit for relay $R^C$ controlled by a front contact of track relay $T^C$, a pick-up circuit for relay $R^A$ controlled by a front contact of track relay $T^A$, a stick circuit for relay $R^A$ controlled by a back contact of track relay $T^C$ and a front contact of relay $R^C$, a polarized relay, means operating when a train enters section A to supply said polarized relay with current of one polarity during the interval between the opening of relay $T^A$ and the opening of relay $R^A$, means operating when a train enters section C to supply said polarized relay with current of the other polarity during the interval between the opening of relay $T^C$ and the opening of relay $R^C$, means operating when two trains enter said two sections simultaneously to supply said polarized relay with current of the second polarity during the interval between the opening of relay $T^C$ and the opening of relay $R^C$ and to subsequently supply the polarized relay with current of the first polarity during the interval between the opening of relay $R^C$ and the opening of relay $R^A$, two indication relays, a pick-up circuit for one indication relay including a neutral contact and one polar contact of said polarized relay, a pick-up circuit for the other indication relay including the neutral contact and the other polar contact of said polarized relay, a stick circuit for each indication relay including a normally closed push button contact, and two indicators controlled by said two indication relays respectively.

In testimony whereof we affix our signatures.

CHARLES A. BROOKS.
LEONARD C. RITTERBUSH.